April 16, 1968  A. R. SCHMOYER  3,377,716
METHOD OF AND APPARATUS FOR TEACHING THE OPERATION OF
A KEYBOARD CONTROLLED MACHINE OR INSTRUMENT
Filed Jan. 12, 1965  3 Sheets-Sheet 3
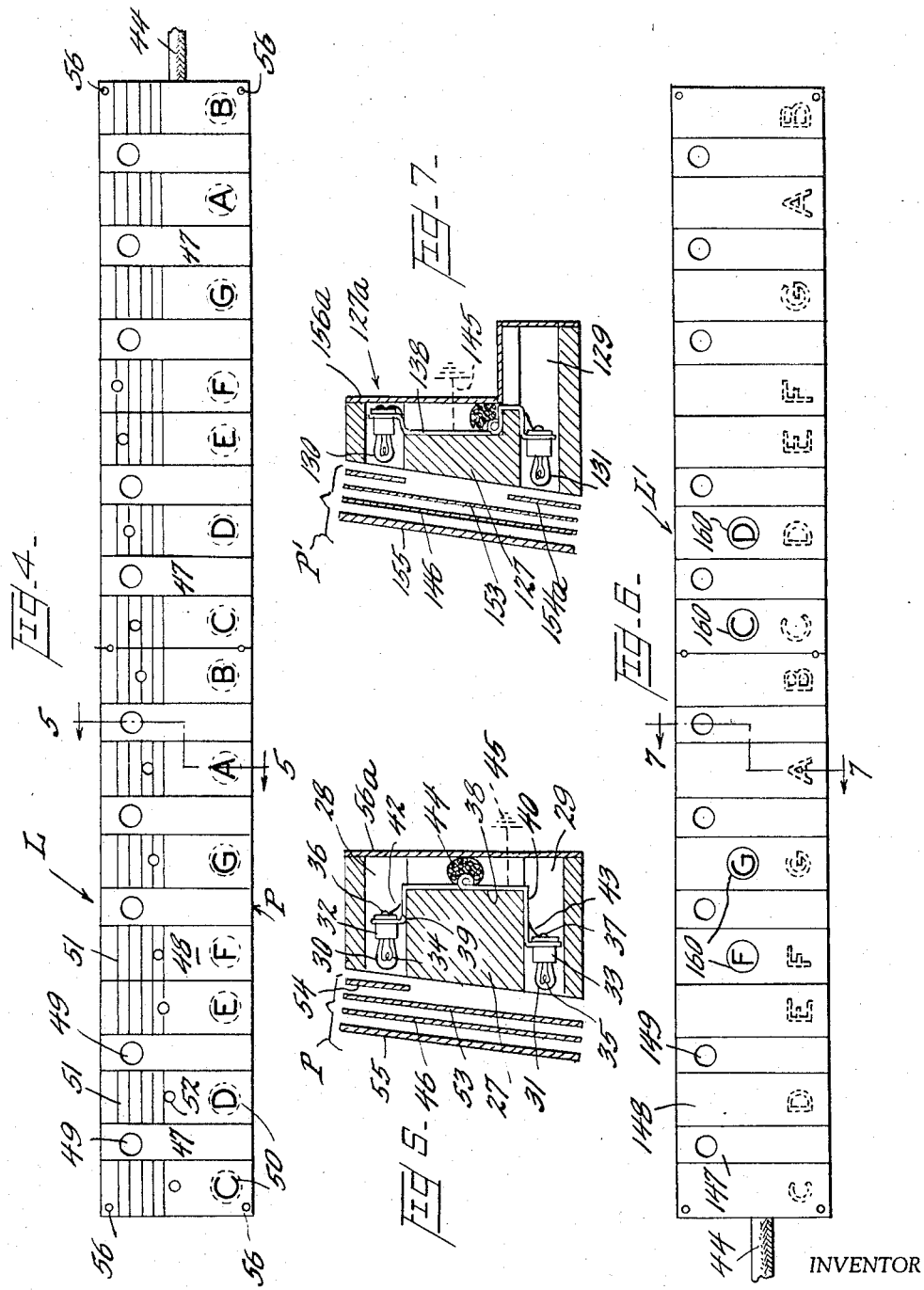
INVENTOR
Arthur R. Schmoyer,
BY
Bradford & Gardina
ATTORNEYS United States Patent Office 3,377,716
Patented Apr. 16, 1968

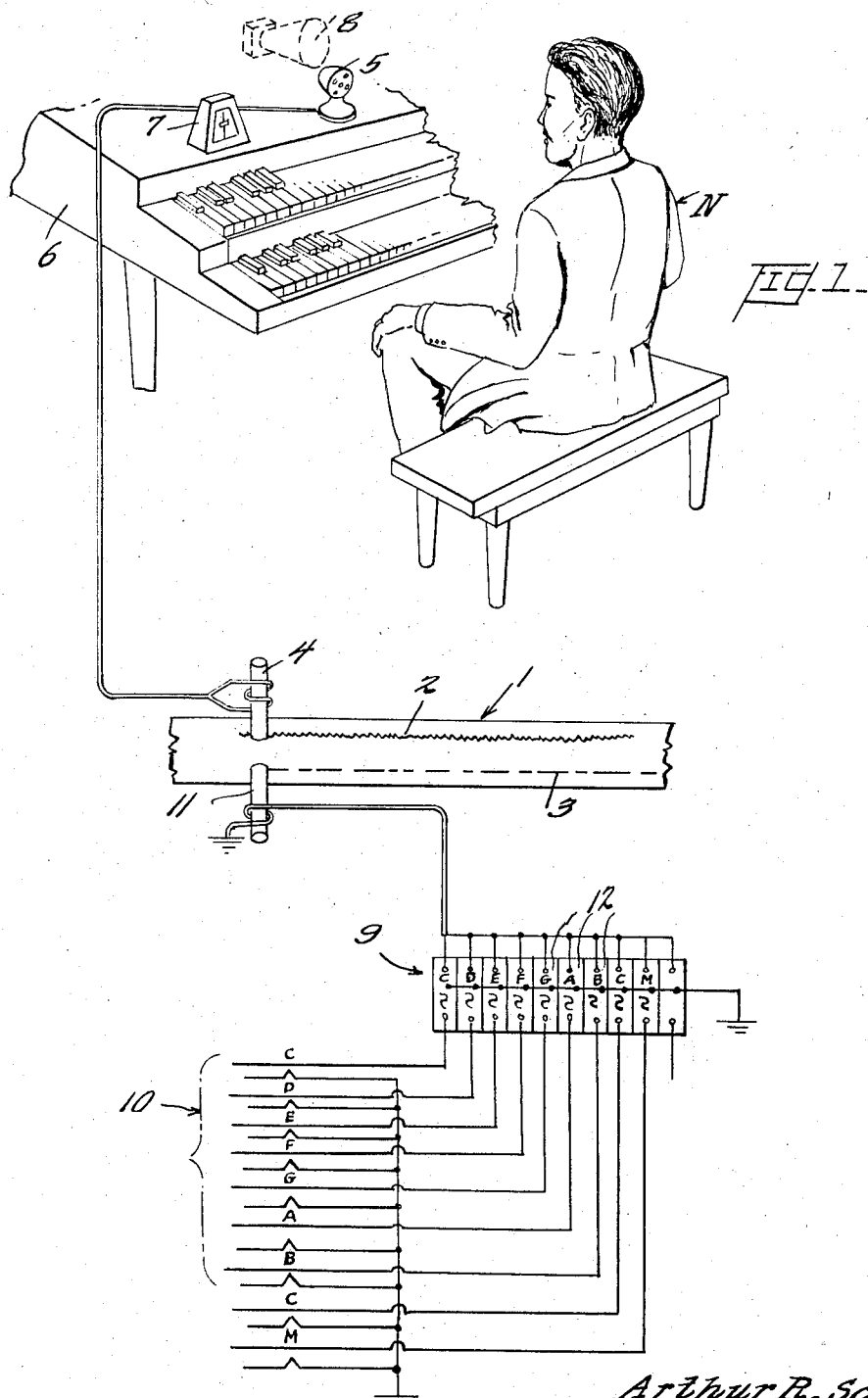

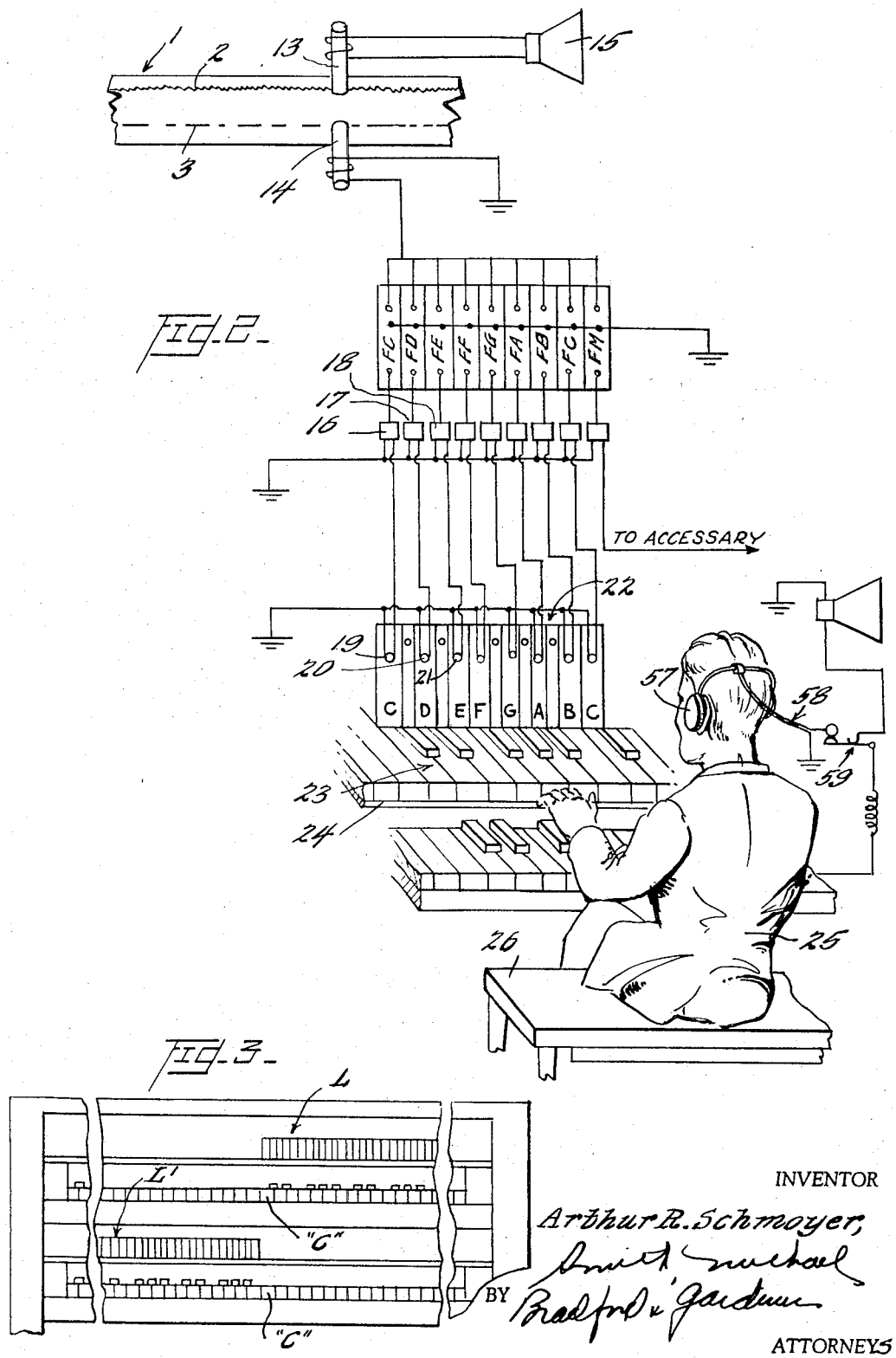

3,377,716
METHOD OF AND APPARATUS FOR TEACH-
ING THE OPERATION OF A KEYBOARD
CONTROLLED MACHINE OR INSTRUMENT
Arthur R. Schmoyer, Falls Church, Va., assignor to
Don S. Wenger, Bethesda, Md.
Continuation-in-part of application Ser. No. 362,360,
Apr. 24, 1964. This application Jan. 12, 1965, Ser.
No. 424,998
6 Claims. (Cl. 35—6)

ABSTRACT OF THE DISCLOSURE

A combined visual-audio teaching aid for keyboard instruments by which a pupil may simultaneously be subjected to vocal and visual stimuli to aid him in identifying a given key which when operated will cause the instrument to perform a given function. The stimuli may be developed by concurrent "readout" of a multiple track record medium bearing a vocal sound track synchronized with a signal impulse track in combination with a loudspeaker and plural visual signal devices respectively, the latter being disposed in identifying relationship to the respective keys of the instrument and being individually and selectively responsive to predetermined electric impulses in code as developed upon "readout" of said signal track.

This application is a continuation-in-part of my application Ser. No. 362,360, filed Apr. 24, 1964.

This invention is a method of and an apparatus for teaching a pupil or trainee to operate the mechanical control devices, such as keys, with which many present day machines and/or instruments are equipped, and which keys control the operating characteristics and functions of such machines. The invention is of general utility in the field of teaching and training but is particularly useful when applied in teaching one to play a keyboard instrument such as a piano or organ.

Previous attempts have been made to facilitate teaching or training in these fields by employing visual or audio aids, but so far as is known, none of these attempts have been entirely successful. Thus, some of the prior devices have required the presence of a teacher to operate some portion of the apparatus, see for instance Patents Nos. 3,080,661, 2,962,819 and 1,889,418. Other prior devices have required more or less drastic modifications of the instrument on which instruction is to be given, see for example Patents Nos. 2,909,956 and 3,091,152. The present invention contemplates the provision of combined visual and audio teaching aids which require no modification of the instrument on which instruction is being given, which is simple in construction and yet has proven to be quite effective in developing in the trainee a higher degree of precision and acuracy of performance than can be expected from devices of the prior art.

One object of the invention is to provide a combined visual-audio teaching aid for keyboard instruments, whereby a pupil or trainee may simultaneously receive visual and audio stimuli to aid him in the selection of the proper key to be operated to cause the machine or instrument to perform a predetermined function.

Another object of the invention is to provide a recording of voice instructions for the trainee, aided by a display device illustrating at least a portion of the keyboard of the instrument, and on which display the individual keys are identified by indicia symbolic of the machine function to be performed when a said key is actuated.

Another object of the invention is to provide means for rendering more discernible or more conspicuous the indicia associated with a key to be actuated, as shown on said display device, simultaneously with the vocal enunciation and identification of said key by said recorded voice instructions when played.

Another object of the invention is to provide illumination means associated with the individual indicia carried by the keys as depicted on said display device, and to selectively energize such means in timed relation to specific reference made to said keys in said recorded vocal instructions to the pupil.

Another object of the invention is to provide accurate synchronization of the vocal instructions and of the energization of predetermined indicia associated with the keys on said display device by placing on the record medium bearing the sound track of the voice instructions, means in the form of a signal track for producing on "play back" electric impulses which can be used to energize selectively one or more relays connected to control said illumination means. By properly orienting selected portions of the impulse producing means of the composite recording, with respect to selected portions of the sound track of the vocal instructions, any desired timed relation between voice and impulse may readily be achieved.

Another object of the invention is to apply the impulse producing means to the record medium in code corresponding to and identified with different individual keys whereby on "read out" the electric impulses are in code and can be readily applied selectively to predetermined relays by simple known decoding apparatus. Any known form of coding and decoding apparatus may be employed, but it has been found convenient to employ a coding device by which modulating impulses of selected frequency may be applied to the recording medium. On "read out" the electric impulses resulting from said modulations may be readily decoded by passing the same through a bank of bypass filters, all of which is suggested by such patents at 2,629,861 and 2,812,510.

A further object of the invention is to provide a keyboard indicator or display device which may be mounted on or in close proximity to the keyboard of an instrument on which instruction is to be given.

These and other objects of the invention will be apparent from a reading of the following specification in connection with the accompanying drawings wherein I have illustrated, by way of example, one adaptation of my invention, and wherein FIG. 1 is a diagrammatic representation of a manner of producing a composite record tape such as is used in practicing the present invention.

FIG. 2 shows diagrammatically the manner in which the tape of FIG. 1 is passed through a "read out" apparatus to provide simultaneous mental stimuli effective upon the sense of hearing and the sense of sight of the trainee.

FIG. 3 is a front view of a two manual organ console with parts broken away and showing the keyboard indicators of the invention mounted therein.

FIG. 4 is a front elevation of a keyboard signal box for the upper manual of an organ keyboard.

FIG. 5 is a sectional view taken on the line 5—5 of FIG. 3.

FIG. 6 is a front elevation of a keyboard signal box for the lower manual of an organ keyboard.

FIG. 7 is a sectional view taken on the line 7—7 of FIG. 5.

As stated, the invention contemplates the provision of a composite recording which will form the basis for mental stimuli effective upon the senses of sight and hearing of the trainee and without the necessity of there being an operator or instructor present when the stimuli referred to, are administered during the course of a lesson.

The composite record hereinbefore referred to may be a standard ¼ inch magnetic recording tape as indicated at 1 in FIG. 1. The tape 1 is designed to carry plural tracks, one of which indicated at 2 is a composite sound track, and the other indicated at 3 is a signal track comprising modulated areas which are effective on "play back" to generate electric impulses which may be used to control through appropriate relays, display apparatus to be hereinafter more particularly referred to. The tape 1 in FIG. 1 is shown diagrammatically in the process of passing through a conventional magnetic tape recorder. The recorder may include a magnetic recording head indicated at 4 to which a microphone 5 is connected. The microphone 5 is shown in proximity to an electric organ 6 and to a metronome 7. The loudspeaker or other tone producing facility of the organ 6 is represented diagrammatically at 8 to emphasize the fact that the microphone 5 is in "pickup" relation to the organ 6. Thus, the sound track 2 is a composite record of sound produced by a narrator N speaking into the microphone 5, and the sound of the organ 6, when a given key or keys thereof are actuated at such time as they are referred to by the narrator in the narrated instruction spoken by him into the microphone 5. In desired selected portions of the sound track 2 there may appear in the background, the audible beat of the metronome 7. The function and relation of the several sounds which comprise the sound track 2 will be fully explained hereinafter.

It is an important object of the present invention to associate with the sound track 2, on the recording strip 1, means for producing on play back, controlled electric impulses which are synchronized or in register with or have a definite timed relation with respect to predetermined portions of the sound track 1, particularly those portions thereof in which recitation has been made of specific keys so that on play back stimuli effective upon the senses of hearing and sight of the pupil will be rendered simultaneously. The reproduced narrated instructions directly affect the sense of hearing of the pupil and the sense of sight of the pupil is stimulated by a display device bearing a pictorial representation of the keys of the instrument on which instruction is being given and in which display device by means hereinafter more fully described, a given key is identified simultaneously with reference thereto in the narrated instructions by rendering indicia associated with said key on the display device more conspicuous than or more readily discernible than other keys included in the display device. A convenient method of providing this desired synchronization or timed relation between the modulations comprising the signal track 3 with respect to selected portions of the composite sound track 2, may be accomplished by "dubbing in" the signal impulse modulations on play back of the composite sound track 2.

The invention contemplates assigning to selected keys of the instrument on which instruction is being given, identifying characters symbolic of the respective notes or symbolic of the machine function to be performed in response to actuating a given key. These identifying and symbolic characters appear on the several keys depicted in the display device, previously referred to. Furthermore, the modulations comprising the signal track 3 are characterized in code to correspond to the identifying symbolic characters assigned to the respective keys. Thus, the invention contemplates modulating the record strip 1 in code characters corresponding to the several keys included in the keyboard of the instrument which are depicted in the display device previously referred to, so that the symbolic characters appearing on selected keys may be made to appear more conspicuous in response to signal impulses produced on "read out" by said signal modulations as will later appear.

Any known type of coding device may be employed for modulating the surface of the strip 1 since the coding device per se forms no part of the present invention. Conveniently, the coded modulations may be made by electric impulses of different frequencies generated by a series of electric oscillators which have been illustrated diagrammatically in FIG. 1 by the reference character 9. Each oscillator is designed to generate a current of distinguishing frequency and the several oscillators are selectively controlled by a bank of manually operated switches indicated generally by the reference character 10. Thus, as any of the switches 10 is operated to close a circuit through the oscillator, the output from the oscillator is directed through an electromagnetic recording head 11 as shown, so that a selected characterizing impulse or modulation is supplied to the body of tape 1. By way of example, in the present instance, the several keys have been assigned identifying characters as represented by the letters C, D, E, F, G, A, B, C, etc., and these identifying characters appear in FIG. 1 on the several frequency channels similarly designated as at 12. In the signal track 3 the several coded impulses have been represented by modulated areas of different length, but it will be understood that this illustration is diagrammatic only and is for the purpose of indicating modulated areas resulting from the application to the recording head 11 of currents of different frequency when the manual switches C, D, E, F, G, A, B, C, . . . M are actuated. It will be recognized of course that the letters C, D, E, F, G, A, B, C, etc., here chosen to identify the keys and the different switches and oscillators as shown in FIG. 1 conform to those usually employed in identifying the different keys on the keyboard of a piano or organ. The multi-channel oscillator 9 and the switches 10 may be controlled by the narrator N or by a separate operator so that on play back of the composite sound track 2 for the purpose of "dubbing in" the signal producing modulations comprising the signal track 3, the switches 10 may be actuated at proper intervals to impose on the strip 1 a modulated code signal oriented in respect to a selected portion of the sound track 2 in which specific recitation or reference to a corresponding key is made by the narrator.

By the method just described, which is by way of illustration only, the composite tape 1 will carry sound track 2 in which the narrator makes specific reference to predetermined, named keys to be operated by a trainee in a given time sequence, and the signal track 3 will carry modulated areas corresponding in code to given keys on the keyboard and each such modulated area being oriented with the composite strip 1 is reproduced as will be described, the coded modulated areas of the signal track will generate in an electromagnetic reproducing head associated with the track, electric impulses synchronized or otherwise oriented in respect to time with the narrated reference to named keys on the keyboard. Thus the signal impulses generated by the modulated areas of the signal track may be utilized to actuate through appropriate facilities now to be described, the display device in a manner to visually call the trainee's attention to a specific key or keys.

In FIG. 2 there is shown diagrammatically the arrangement of the play back apparatus which includes two conventional electro-magnetic reproducing heads 13 and 14, in register with and operatively associated respectively with the sound track 2 and the signal track 3 of the tape 1. The reproducing head 13 is connected to a loudspeaker 15 from which will flow the audible instructions to the pupil to actuate predetermined, named keys in a given timed sequence and thus stimulate the mind of the trainee through the sense of hearing.

Concurrently, and in accurate synchronization with or other timed relation to the recited named keys in the reproduced instructions, the electromagnetic head 14 will pick up the coded impulse-producing modulations from the signal track 3 which impulses are, as previously suggested and as will be later explained, arranged to provide stimuli effective upon the trainee through his sense of sight. It will be realized, of course, that the coded modulations of the signal track 3 will be picked up by the reproducing head 14 in a "scrambled" disorder and that means must be provided for "unscrambling" the resulting signal impulses in order to properly and selectively control the delivery of said impulses to the individual keys and the indicia carried thereby, as depicted on the display device previously referred to. To this end, the composite signal impulses picked up by the recording head 14 are delivered to a plurality of band pass filters indicated at FC, FD, FE, etc., and the respective outputs of which are connected to associated control relays 16, 17 and 18, etc., which in turn selectively control circuits to signal lights associated with the individual keys such as are shown at 19, 20 and 21, etc., included in a keyboard display device which is indicated generally by the reference character 22 and which, in the arrangement shown in FIG. 2, is associated in close proximity with the keyboard 23 of the musical instrument 24 on which instruction is being given. The trainee, indicated by the reference character 25 may be seated on a bench or stool 26 before the keyboard 23 of the instrument so that the signal lights 19, 20, 21, etc., are clearly visible to him.

The display device indicated diagrammatically in FIG. 2 by the general reference character 22 is shown more particularly in FIGS. 4, 5, 6 and 7 of the drawings, to which more specific reference will be made hereinafter.

It will be noted in FIG. 2 that the display device includes a pictorial representation of a group of keys comprising one complete octave of the keyboard of the musical instrument 24 and that the pictorial representations of the several keys bear symbolic identification such as the letters C, D, E, F, G, A, B and C corresponding respectively to the several code frequency channels provided by the oscillator 9 in FIG. 1. Thus, a modulated area of the signal track 3 of the tape 1 resulting from an impulse from the frequency generator C associated with switch C of the bank of switches indicated at 10 in FIG. 1, will, when the tape 1 is passed through the dual head recording apparatus shown in FIG. 2, produce an electrical impulse which when properly channeled through the decoder filter channel FC and relay 16, will be effective to cause the light 19 associated with the pictorial representation of the key C on the display device 22 to be energized, thus rendering this key more conspicuous or more readily discernible than the other keys in the display device associated with the keyboard of the instrument before which the trainee is seated, and this illumination of the signal light 19 will occur simultaneously with the reference to this key in the reproduced narrative instruction so that the mind of the trainee is jointly stimulated by the audible stimuli and by the visual stimuli afforded on play back by the recordings on the strip 1.

It will be understood, of course, that although there has been illustrated in FIG. 2 of the drawings but a limited number of code and/or frequency channels, corresponding to selected keys or notes in one octave, in actual practice there are provided as many code and/or frequency channels as are necessary to realize fully all of the advantages of the present invention. Basically I provide a separate frequency channel for each white key and for each black key within one octave of keyboard. When a keyboard indicator or display device is used on which is depicted the keys of a single octave such as shown at 22 in FIG. 2, the electric signals from the modulations comprising the sound track 3 are selectively delivered to the corresponding lamps 19, 20 and 21, etc., as clearly shown diagrammatically in FIG. 2. However, when it is desired to utilize a keyboard indicator or display device having depicted thereon a greater number of keys, such as for example the display device having the keys of two full octaves depicted thereon as shown in FIGS. 4 and 6, then the number of frequency channels is correspondingly increased to properly serve the resulting additional number of signal lamps, or means must be employed for selectively directing the signals from the smaller number of frequency channels as shown in FIG. 1 to corresponding signal lamps of the keys comprised within the respective octaves depicted on the two-octave display device as the narrator may direct attention to specific lamps in the different octaves. Similarly, when two keyboard indicators or display devices are employed as shown diagrammatically in FIG. 3, means are provided for selectively directing the signal impulses to the proper display device in synchronism with the narrator's instructions directed to the keys depicted on the respective display devices. The means for selectively controlling the application of signal impulses to the proper keys where two or more octaves are depicted on one or more display devices, forms no part of the present invention and any known means for performing these functions may be used as desired. It should also be noted that economy in the number of frequencies required may be effected by using two or more voltage levels of the same frequency to actuate different signal devices associated with corresponding notes. Furthermore, where a "lesson" includes reference to chords (which require the actuation of two or more keys simultaneously), additional code and/or frequency channels would be provided for such chords, together with appropriate circuit means whereby corresponding relays would control circuits to the two or more signal lamps associated with the keys comprised within such chords. Additional channels such as shown at M may also be provided to control accessory equipment or apparatus to which reference will later be made.

In FIGS. 1 and 2 I have shown symbolic code or frequency characters assigned to the "white" keys C, D, E, F, G, A, B and C, but it is to be understood that in practice I contemplate that the "black" keys A♯, C♯, D♯, F♯ and G♯ may be similarly identified by appropriate code or frequency characters and that when so identified the coding device 12 will include added code frequency channels corresponding to the respective black keys and the decoder will include band pass filters designed selectively to pass the added code impulses to appropriate relays which in turn selectively control signal circuits to lamps associated with the "black" keys on the respective indicators.

In FIGS. 4 and 5 I have shown by way of example, a preferred construction of a display device such as has been referred to hereinbefore. The display device of FIGS. 4 and 5 is designed for the treble portion of a single keyboard instrument or for the upper manual of an organ and comprises a lamp box shown in transverse cross section in FIG. 5, including an elongated base member 27 of wood, plastic or the like and provided with two vertically spaced rows of horizontal bores 28 and 29 extending from front back through the base member 27. The bores of each row are spaced longitudinally in the base 27, and within each of the bores 28 and 29 is positioned a signal lamp 30–31, said lamps being provided preferably with metal bases 32–33 respectively, connected to one end of filaments 34–35, the opposite ends of which filament are connected to centrally exposed contacts 36–37. The lamps or bulb 30–31 may be mounted in any convenient manner within the bores 28 and 29 and by way of Example I have shown the lamps mounted within apertures in a metal plate 38 secured to a rear face of the block 27 and carrying a plurality of lamp supporting arms 39–40, one of which extends into each of the bores 28 and 29. Each of the arms may be perforated to receive the metal base of a lamp and thus place one end of the filament thereof in contact with said plate 38, leaving the central contacts 36–37 exposed for connection to circuit wires 42–43 which, in turn, through cable 44 are connected to the respective relays 16, 17, 18, etc., as shown in FIG. 2. The cable 44 may pass from the lamp box through an appropriate aperture in an end wall thereof as shown in FIGS. 4 and 6. The plate 38 may be grounded as at 45. By this or any other equivalent or desired circuitry the individual lamps 30–31 may be selectively energized in response to actuation of the several relays 16, 17, 18, etc., as previously described.

The front face of the lamp box L or housing comprising the base 27 is closed by a multi-layered front panel member P, shown in FIG. 4, for the sake of clarity, with the several layers separated. As will later appear, the panel P is provided with translucent portions in alignment respectively with the several lamps 30–31, and through which illumination emanating from said lights is visible. In order to conveniently distinguish between the white keys and the black keys of the keyboard depicted on the display device as shown in FIG. 4, the front panel P includes a sheet or panel member 46, such as a photographic positive film strip, on which a desired number of keys of the instrument keyboard are illustrated substantially in scale measurement with the actual transverse dimension of keys on the keyboard, so that as will hereinafter be described, when the display device is mounted in close proximity to the keyboard, the several keys as depicted on the display device will be in alignment with the actual keys on the keyboard as clearly shown diagrammatically in FIG. 2 and in FIG. 3. As shown in FIG. 4, the panel 46 depicts two full octaves of the keyboard.

On the film strip or panel member 46 the keyboard indicia indicating the black keys is preferably opaque black as indicated at 47, while the portions 48 indicating the white keys, are clear but by reason of a white background sheet or panel 53 to be later described, said areas appear by contrast white. Each of the black key representations 47 bears a light-transmitting area or window 49 which areas are in alignment respectively with lights 30 of the upper row of lights within the lamp box 27. To further individually characterize the keys in the display device, the representations 48 of the white keys carry identifying indicia such as the letters C, D, E, F, G, A, B, and C hereinbefore referred to, which are aligned respectively with lights 31 of the lower row of lights so that when said lights are energized, the several key identifying characters C, D, E, F, etc., will show in silhouette on an illuminated spot or "window" indicated in dotted lines at 50. A representation of a musical staff as shown at 51 is depicted on each "white" key, and on each such staff there is depicted a musical note 52 placed on the staff in a position indicating the place on the musical scale of the tones associated with the respective keys when struck.

As previously stated, the film strip or panel member 46 is backed by a second panel member or sheet 53 of white translucent plastic to form a natural white background coloring for the "white" keys and the symbolic characters C, D, E, F, G, A, B, and C, etc. carried thereby. Furthermore, to give a desired color contrast between the illuminable areas 50 of the white keys 48 and the illuminable areas 49 of the black keys 47, there is interposed between the panel 53 and the lamp box 27 a colored light-transmitting sheet 54 dimensioned to cover only the top row of lights 30 within the lamp box 27. The light-transmitting sheet 54 is preferably colored red so that when a selected one of the lamps 30 of the upper row of lamps is energized, that black key will be identified by a red spot at 49 as the light from the lamp box passes through the successive sheets or panels. If desired, a protecting fully transparent sheet or panel 55 may be provided as an outside protecting sheet for the multi-layer panel P covering the lamp box. The composite multi-layered panel member may be attached to the lamp box 27 in any convenient manner such as by a plurality of pins, screw members 56. A plate 56a of any desired form may close the rear of the lamp box 27.

In the illustrated embodiment of the invention, reference has been made to an "organ." It is contemplated that the "organ" is an electric organ according to present-day demands and that it comprises plural keyboards for operation by the hands of a player together with, if desired, a bank of foot pedals (not shown) to be operated by the feet of the player. It will be understood, therefore, that in actual practice there may be two display devices similar to each other but not necessarily exact duplicates of, the display device just described. The one just described is designed to be associated with the upper bank of keys and the other one of which will be associated with the lower bank of keys on a two manual organ as shown in FIG. 3. In such an arrangement the number of code frequency channels as represented in FIG. 1 will be expanded as necessary to comprehend the additional number of keys to be individually identified and similarly the decoding apparatus shown in FIG. 2 will be provided with a correspondingly increased number of band pass filters to supply electric impulses selectively to an appropriate number of relays.

I have shown in FIGS. 6 and 7 a preferred form of keyboard indicator L' for use on the bass portion of a piano keyboard or on the lower manual of an organ keyboard. This indicator follows generally the construction of the display device for the upper manual as previously described but differs therefrom in the following respects. The multi-layer front panel P' includes a sheet in the form of a photographic positive film strip 146 bearing keyboard indicia including black key and white key representations 147 and 148, respectively. The keyboard delineations are in opaque black while the remaining portions of the film strip are clear. Each black key 147 is provided with a clear display or signal area or window 149 positioned to be aligned respectively with the lamps 130 of the upper row of lamps in the lamp box 127. There are no "windows" as such in the clear portions of the film 146 depicting the white keys 148, but provision is made for properly identifying these keys when the signal lamps 131 or the lower row of lamps in the box 127 are illuminated. To this end a sheet 153 of white translucent plastic is placed behind the film strip 146 as shown. The sheet 153 is preferably coextensive with the film strip 146 and extends over both rows of lamps 130 and 131. Behind this sheet 153 and covering the lower row of lamps 131 only is placed a photographic negative film strip 154a which carries a row of clear key designation characters C, D, E, F, G, A, B, C, etc., each of which is aligned with one of the lamps 131 in the lower row of lamps in the indicator L'. As thus arranged the key designations C, D, E, F, G, A, B, C, etc. on the film strip 154a will normally remain invisible at the front of the panel until a lamp or lamps in the lower row of lamps 131 are energized, whereupon such of the letters C, D, E, F, G, A, B, C, etc., as are aligned with the lamps 131 that are energized will become visible from the front of panel 146 by light from said lamps being projected through the clear characters on the film 154a and through the translucent sheet 153. Therefore, the key designation letters C, D, E, F, G, A, B, C, etc. are shown in FIG. 6 in dotted lines.

Behind the upper portion of the sheet of white plastic 153, is placed a strip of colored light-transmitting material 154, such as red cellophane. This strip lies in front of the upper row of lamps 130 only so that when any of said lamps is energized, the corresponding display window 149 shows "red." Covering the front face of the film strip 146 is a clear sheet or panel member 155 which may be of Plexiglas or similar transparent material.

In view of the fact that the lower manual or keyboard of an organ is generally employed to furnish the proper chords to accompany the melody as played on the upper manual, I provide on the panel or strip 146 and so the white key areas 148 thereof chord indicia as shown at 160. The chord indicia 160 may be depicted by solid letters of contrasting color on center portions of the white key areas 148, the chord indicia 160 comprising letters such as C, D, F, G by which the chords must often played, are identified.

It will be noted that the rear portion of the lamp box 127 is cut away as at 127a in order to conform to a trim strip (not shown) on an organ for which this display device was designed and that the closure plate 156a and the lamp supporting plate 138 are similarly contoured. Thus it is of course understood that the keyboard indicators may be modified as needed to conform to the instrument with which they are to be used.

It should be noted that while I have not shown key symbols A♯, C♯, D♯, F♯ and G♯ applied to the "black" key representations in FIGS. 2, 4 and 6, it will be understood that these symbols may be used if desired. I have found, however, that the color contrast provided by the cellophane strips 54 and 154 for the areas 49 and 149 of the black keys when illuminated, sufficiently distinguish these areas from the illuminated areas 50 and the clear letters 150 on the "white" keys, and thus render further and more particular identification unnecessary.

In FIGURE 3 I have shown more or less diagrammatically the manner in which the keyboard signal or display devices L and L' of FIGS. 4 to 7 are associated with the manuals of a two manual organ. While the display devices may be properly oriented with the keys of any desired octaves on the respective manuals, I have shown in FIG. 3, by way of example only, the display devices oriented with respect to middle C so that the keyboard indicator L on the upper manual extends generally from middle C upward or to the right as viewed in FIG. 3 and the keyboard indicator L' on the lower manual extends downward or to the left of middle C as viewed in FIG. 3.

It will be understood of course, that in use the multilayer or laminated panel members P and P' are secured in surface contact with the front face of the blocks 27 and 127, respectively, with the several laminations of said panel members in superposed surface contact with each other, and that the "exploded" illustrations of these panels as shown in FIGS. 5 and 7 are for the purpose of clarity only.

Furthermore, it will be apparent to those skilled in the art of visual aids that the keyboard delineation and other indicia carried by the positive film strip 46, of FIG. 5, and 146 of FIG. 7, and the indicia carried by negative film strip 154a of FIG. 7, together with the colored strips of cellophane 54 and 154 may be applied directly to the front and rear faces of the sheets 53 and 153 respectively, by printing, stencils, decals or the like, and thus provide a panel member comprising but a single sheet, covered if desired by the transparent covering sheet 55 or 155.

One additional feature of the invention is that it provides means whereby the student or trainee may "supervise" his own performance on the keyboard with respect to accuracy of choosing the proper key to be played in response to the reception of plural stimuli effective through his senses of sight and hearing. To this end, I have shown diagrammatically in FIG. 2 an ear phone attachment 57 by which the trainee may "plug in" on the loudspeaker or other sound producing facility of the organ 24 in order to hear the tone produced by the organ as a result of his actuation of a given key. To facilitate this operation, the head set or earphones 57 are connected to a plug 58 which may be inserted in a jack 59 connected in a known manner to the loudspeaker circuit of the organ 24 in a manner so that when plugged in, the plug connection will function to cut out of the circuit, the loudspeaker of the organ and connect the earphones thereto.

It will be understood, of course, that the earphones here referred to fit loosely about the ears of the pupil and will not interfere with the reception of sound by him, emanating from the loudspeaker 15. I have included in FIG. 2 rather diagrammatically the arrangement of the plug and jack connection just referred to. In this figure it will be seen that the circuit to the loudspeaker of the organ is normally closed through the jack but that on insertion of the plug 58 into the jack 59 the head of the jack will engage and open the switch which normally maintains the loudspeaker circuit closed and simultaneously will connect the ear phones 57 to the sound circuit of the organ.

By way of example, the composite sound track 2 on the tape 1 may include a complete "lesson" including an introductory narrative acquainting the pupil with the general nature of the instrument, the arrangements of the keyboards, the manner in which a given hand is associated with a keyboard and any other information vital to the comprehension of the lesson by the pupil. During the introductory portions of the narrative, the organ 6 may be softly played so that its sound will furnish a proper musical background for the narration. If desired, during the introductory portion of the narration and before the pupil is required to respond to instructions in the narration, the narrator may refer specifically to given keys and concurrently sound or strike such keys so that the pupil may become acquainted with the sound associated with a given key, and synchronized therewith the signal track may carry a signal impulse which on play back will result in the identification of said key on the display device mounted on the keyboard of the instrument. After the preliminary narration has been completed, the narrator will give specific instructions to the pupil to play predetermined keys in a given sequence and as previously described, the signal track will carry modulated portions in code corresponding to the keys to which specific reference has been made, so that proper and selected response to these modulations will, on play back, appear on the display device as accentuated indicia of the particular key involved. During this portion of the narration, the metronome as shown at 7 may be in operation in order that a proper audible beat may appear in the play back.

The lesson or narrated instruction may include any appropriate material and may be of any desired length, and the reel carrying the composite tape may be readily applied to and removed from a conventional tape recorder without the necessity of there being present during the lesson, an operator or instructor.

It will be understood that while the illustrated embodiment of the invention described herein has been limited to a lesson directed to a single pupil, it is within the concept of the invention to utilize the method described herein as a means for instruction of a plurality or group of students in which event a display device carrying a pictorial representation of the keys of the instrument on which instruction is being made, might be displayed on a large scale on a platform in an auditorium and with proper and similar circuitry as herein described said display device would be actuated in response to play back of a composite tape such as herein described, in a manner such that a large audience or a large group of pupils or trainees might all receive simultaneously, synchronized stimuli effective upon their respective sight and hearing senses, with the same advantages as have hereinbefore been related.

As an alternative method of instruction for a group of students or trainees, each of said pupils may be seated at an organ such as shown in FIG. 3, and each such organ may be equipped with keyboard indicators or display devices L and L' such as shown in FIGS. 4 to 7. The circuitry previously described would be modified to the extent that multiple circuits would be controlled by relays such as shown at 16, 17 and 18 in FIG. 2, and an appropriate circuit from each relay would run to a corresponding key signal on each indicator or display device so that all of the indicators would respond in unison to electric impulses selectively delivered to the several relays.

It should also be understood that while the invention has been herein described as including relays selectively responsive to coded impulses appearing on the modulated signal track of the composite tape, and these relays employed to selectively actuate proper indicia on a display device, the invention is not restricted in use to such limited use of the electrical impulses resulting from the modulated area of the signal track. It is within the concept of the invention to provide coded signals, if desired, which may be utilized in selectively energizing relays which may be employed to control other visual or audio facilities performing additional visual and/or audio aids to the lesson to make the same more complete and comprehensive. By way of example, there may be relays which control slide projectors, move projectors, pointers or similar apparatus.

In the circuit diagrams shown in FIGS. 1 and 2 it will be noted that conventional control switches, sources of electrical potential, amplifiers, and motors for driving the tape in the recording and reproducing apparatus, have been omitted to simplify the diagram but it is of course understood that such well-known appurtenances are contemplated and may be operatively included in the circuitry as desired to accomplish the results clearly described in the foregoing specification.

It will be understood that the specific example herein given and described is but for the purpose of example only and that various changes and modifications in the parts herein described may be made without departing from the spirit of the invention which is set forth in the appended claims.

I claim:

1. The method of teaching a pupil to operate a machine having a keyboard comprising providing a display device depicting the keys on at least a portion of said keyboard, identifying the keys on said display device by characterizing indicia symbolic of the machine function performed when the respective keys are struck, providing an extended magnetic tape bearing a reproducible sound track recording of vocal instructions to the pupil to actuate named keys in a predetermined timed sequence and also bearing a signal track recording of coded electric impulse-producing modulations with selected portions thereof in register with and in side-by-side relation to selected portions of the vocal sound track thereon, audibly reproducing said recording of vocal instructions by passing the tape through a stationary "read out" device including plural magnetic heads, one of which is in register with the vocal sound track of said tape, and concurrently rendering the indicia associated with selected keys on the display device as recited in said vocal instructions more conspicuous than that of all other keys depicted on said display device in response to electric impulses developed within a second magnetic head of said "read out" device which second head is in register with the signal track recording on said tape.

2. The method of teaching a trainee to operate a keyboard controlled instrument comprising providing an extended tape record medium, having formed thereon a reproducible vocal sound track of instructions to the trainee in respect of keys on said instrument, and also having a reproducible signal track comprising coded magnetic electric impulse-producing modulations corresponding respectively to keys on said keyboard to which reference may be made in the vocal instructions embodied in said sound track with selected portions of said tracks in register, providing a display device illustrating a portion of the keyboard including the several keys referred to in said vocal sound track, individually identifying the keys depicted on said display device by applying thereto characterizing indicia, concurrently reproducing the vocal sound track and the coded signal track by passing said extended tape record medium through a stationary "read out" device having plural magnetic heads, one of which is in register with said vocal sound track and another of which is in register with the signal track, and rendering the indicia of selected keys in said display device more conspicuously discernible than other indicia in said display device in response to the development in the magnetic head which is in register with said signal track of coded electric impulses corresponding to said selected keys in register with the audible reproduction of the vocal reference to said keys in said vocal sound track as reproduced by the magnetic head in register with said sound track.

3. The method of teaching a pupil to play a keyboard-operated musical instrument comprising providing a display device visible to the pupil illustrating a portion of the instrument keyboard, depicting on said display device the individual keys comprised within that portion of the keyboard illustrated in said display device, applying to the individual keys as so depicted characterizing indicia symbolic of the notes sounded when the respective keys are struck, providing an extended tape record medium bearing a reproducible sound track recording of vocal instructions to the pupil in respect of selected keys depicted in said display device, and bearing also a reproducible signal track recording comprising coded magnetic electric impulse-producing modulations corresponding respectively to the keys depicted on said display device and with selected portions of said tracks in register, concurrently reproducing said recordings by passing said extended tape record medium through a stationary "read out" device having plural magnetic heads, one of which is in register with the vocal sound track and another of which is in register with the signal track, rendering selected indicia in said display device conspicuously more discernible than any other indicia on said display device in response to coded electric impulses corresponding to said selected keys which impulses are developed in the magnetic head which is in register with said signal track while audibly reproducing a registering portion of the vocal sound track passing through the magnetic head which is in register therewith, thereby to stimulate the pupil mentally by sight and by sound to aid in the proper identification of the keys.

4. The method described in claim 3 wherein the mental stimuli administered to the trainee through his sense of sight includes exhibiting to him, at the time a given key is identified on said display device, a pictorial representation of a musical staff with a note shown thereon indicating the position on the musical scale of the tone produced when said key is actuated.

5. The method of teaching a pupil to play a musical keyboard instrument comprising providing a display device visible to the pupil and depicting at least a portion of the instrument keyboard, applying identifying symbolic indicia to the individual keys shown on said display device, providing an extended magnetic tape bearing a reproducible magnetic recording including a sound track of vocal instructions to the pupil in which specific reference is made to specific keys included in said display device, providing on said extended tape a signal track comprising a series of coded electric-impulse-producing modulations corresponding respectively to said specific keys and oriented thereon in predetermined register with selected portions of said sound track in which selected keys depicted on said display device are mentioned, "reading out" electromagnetically the sound track and the signal track on said recording by passing said tape through a stationary "read out" device having plural magnetic heads one of which is in register with the vocal sound track to reproduce audibly the vocal instructions and to concurrently produce coded electric impulses within a second magnetic head in said "read out" device disposed in register with said signal track, decoding the electric impulses, and energizing selectively the indicia associated with keys depicted on said display device corresponding to the keys recited in the vocal instructions in response to the coded electric impulses corresponding respectively to said keys and in register with the audible reference thereto in the reproduced sound track.

6. In a visual-audio teaching apparatus, a keyboard indicator device adapted to be mounted on the keyboard of a musical instrument and including pictorial representations of predetermined keys on said keyboard, key identifying signal means within said indicator device for keys depicted thereon, means for selectively actuating said key identifying signal means comprising a plurality of relays respectively controlling circuit means to the several key identifying signal means, and means for audibly identifying a given key depicted on said indicator device and simultaneously supplying to the relay controlling the circuit to said key identifying signal means, an electric impulse in code corresponding to said key, said last recited means comprising a record strip having thereon a vocal sound track recording, and an impulse signal track recording in code, and in side by side relation, with selected portions of said tracks in register and a stationary read out device including plural magnetic heads one of which is in register with the vocal sound track and another of which is in register with the signal track on said tape whereby on playback, audible identification of a given key occurs in register with the production of a coded signal impulse corresponding to said key.

References Cited

UNITED STATES PATENTS 3,194,895 7/1965 Treadwell _____ 35—9
3,294,924 12/1966 Fein _____ 35—9

EUGENE R. CAPOZIO, *Primary Examiner.*

W. W. NIELSEN, *Assistant Examiner.*

UNITED STATES PATENT OFFICE

CERTIFICATE OF CORRECTION

Patent No. 3,377,716                          April 16, 1968

Arthur R. Schmoyer

It is hereby certified that error appears in the above numbered patent requiring correction and that the said Letters Patent should read as corrected below.

In the heading to the printed specification, lines 5 and 6, for "assignor to Don S. Wenger, Bethesda, Md." read -- assignor of 50 percent to Don S. Wenger, Bethesda, Md. --.

Signed and sealed this 3rd day of December 1968.

(SEAL)
Attest:

Edward M. Fletcher, Jr.                          EDWARD J. BRENNER
Attesting Officer                                Commissioner of Patents